H. Shattuck.
Power Hammer.

N° 49,593.   Patented Aug. 22, 1865.

Witnesses:
Bennet Hotchkiss
R Fitzgerald

Inventor:
Henry Shattuck

UNITED STATES PATENT OFFICE.

HENRY SHATTUCK, OF HAMDEN, ASSIGNOR TO BENNET HOTCHKISS, OF NEW HAVEN, CONNECTICUT.

IMPROVED ATMOSPHERIC HAMMER.

Specification forming part of Letters Patent No. 49,593, dated August 22, 1865.

*To all whom it may concern:*

Be it known that I, HENRY SHATTUCK, of the town of Hamden, in the county of New Haven and State of Connecticut, have invented a new and useful Improvement in Atmospheric Hammers, as an improvement on those patented by Bennet Hotchkiss, dated June 14, 1859, September 15, (antedated July 2,) 1863, and May 3, 1864; and I do hereby declare that the following is a full, clear, and exact description of the construction, character, and operation of the same, reference being had to the accompanying drawings, which make part of this specification, in which—

Figure 1:
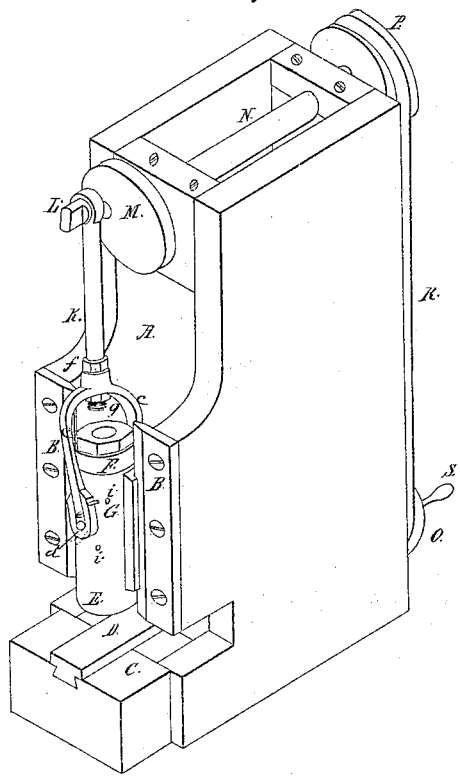
Figure 2:
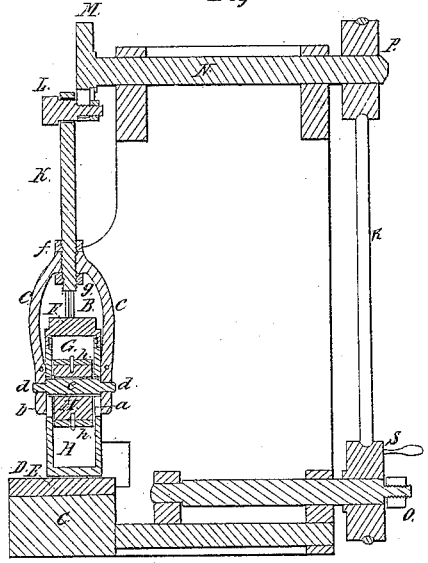

Figure 1 is a perspective view of the hammer fitted for operation, showing the cylinder, ways, connecting-rods, &c. Fig. 2 is a section of the same cut vertically through the center, showing the inside of the cylinder, piston, packing, &c.

My improvement consists in making the lower end of the cylinder solid, to serve as a hammer or holder of any suitable upper die, and with suitable slots in each side to receive the noddle or joint pin of the forked connecting-rod; and in making a piston with a hole horizontally through its center to receive the noddle-pin, and screw-holes to receive packing on each end suitable to make the piston work air-tight.

I make the frame A A of cast-iron or any other suitable material, substantially in the form indicated in the drawings, and I attach to the front parts two vertical ways or guides, with their inner edges beveled suitably to fit the V-shaped grooves in the ribs on the sides of the cylinder, as shown at B B, Fig. 1, and I connect with its front part a suitable block or bed, as E, with a groove or other suitable means to receive and hold a die, as D, suited to the kind of forging required.

I make the hollow cylinder G G of wrought-iron or any other suitable material, of some three or four diameters in length, with the lower end solid to constitute the hammer, as E, into which a suitable die is to be inserted; and I fit in a close head by means of a screw, as shown at F, Figs. 1 and 2, or otherwise, so as to be air-tight; and in its central part I cut two opposite longitudinal slots, as indicated at *a* and *b*, Fig. 2, through which I attach the forked connecting-rod *c c* to the piston H, as shown at *d d*, and in two or more suitable places on the side, as at *i i*, I drill holes to admit air.

I make the piston of a solid piece of iron or any other suitable material, of about one-half the length of the inside of the cylinder, and with a hole drilled horizontally through its center to receive the cross-pin *e*, Fig. 2, by which I attach it to the two extremities of the forked connecting-rod, as shown at *d d*, Fig. 2, and *d*, Fig. 1, and I secure a suitable packing to each end of this piston, as shown at *h* and *h*, Fig. 2, by a proper screw in the center or otherwise, so that the piston may work air-tight.

I make the lower part of the connecting-rod *c c* in the forked or bowed form, as shown in Figs. 1 and 2, so as to be readily attached to the two ends of the noddle-pin *e*, Fig. 2; and at the upper extremity of this forked or bowed part I attach by adjusting-nuts, as shown at *f* and *g*, a rod, K, the upper end of which I connect with an adjustable crank-pin, L, adjusted to a disk or face-plate, M, on a suitable shaft, as N, which is to be revolved by a band, R, and pulleys O and P, as indicated in the drawings, or in any other convenient or suitable way.

Having made the several parts as before described, I put the piston H into the cylinder G, and pass the noddle-pin *e* through the slots *a* and *b* in the side of the cylinder, and attach the forked extremities of the connecting-rod, and screw in the head F, all as indicated in section in Fig. 2. I then put the cylinder in its place in the ways B B and adjust the rod K in the forked part, as at *f g*, and to the disk or face-plate M by the screws L, when all will appear as in Fig. 1 and be ready for use, when it may be put in operation by means of the band R, pulleys O and P, and crank-pin S, or otherwise. When the piston H is forced by the momentum, &c., toward one end of the cylinder, it will close the air-hole, as *i*, and compress the pent-up air, so that it will act as a cushion to the piston in the same manner and in all respects as is described and set forth in the patents issued to Bennet Hotchkiss, June 14, 1859, September 15, (antedated July 2,)

1863, and May 3, 1864, and now extensively in use.

What I claim as my invention, and desire to secure by Letters Patent, is—

1. The combination of the cylinder G with the piston H, when constructed and made to operate substantially as herein described.

2. The combination of the piston H with the forked connecting-rod $c\ c$ and the noddle-pin $e$, when the noddle-pin works in two longitudinal slots in the cylinder and the whole is constructed, connected, and made to operate substantially as herein described.

HENRY SHATTUCK.

Witnesses:
 BENNET HOTCHKISS,
 R. FITZGERALD.